INVENTORS
BERNARD KRASNICK
RICHARD J. ROMAC
MENASHE S. SIMHI
BY Fred Jacob
ATTORNEY INVENTORS
BERNARD KRASNICK
RICHARD J. ROMAC
MENASHE S. SIMHI
BY
Fred Jacob
ATTORNEY INVENTORS
BERNARD KRASNICK
RICHARD J. ROMAC
MENASHE S. SIMHI
BY
Fred Jacob
ATTORNEY

INVENTORS
BERNARD KRASNICK
RICHARD J. ROMAC
MENASHE S. SIMHI

BY Fred Jacob
ATTORNEY 3,337,747
Patented Aug. 22, 1967

3,337,747
ANALOGUE PHASE AND FREQUENCY SYNCHRONIZER FOR DATA COMMUNICATIONS

Bernard Krasnick, Cochituate, Menashe S. Simhi, Watertown, and Richard J. Romac, Sudbury, Mass., assignors to Honeywell Inc., a corporation of Delaware

**Filed July 31, 1963, Ser. No. 298,823
16 Claims. (Cl. 307—88.5)**

Figure 1:
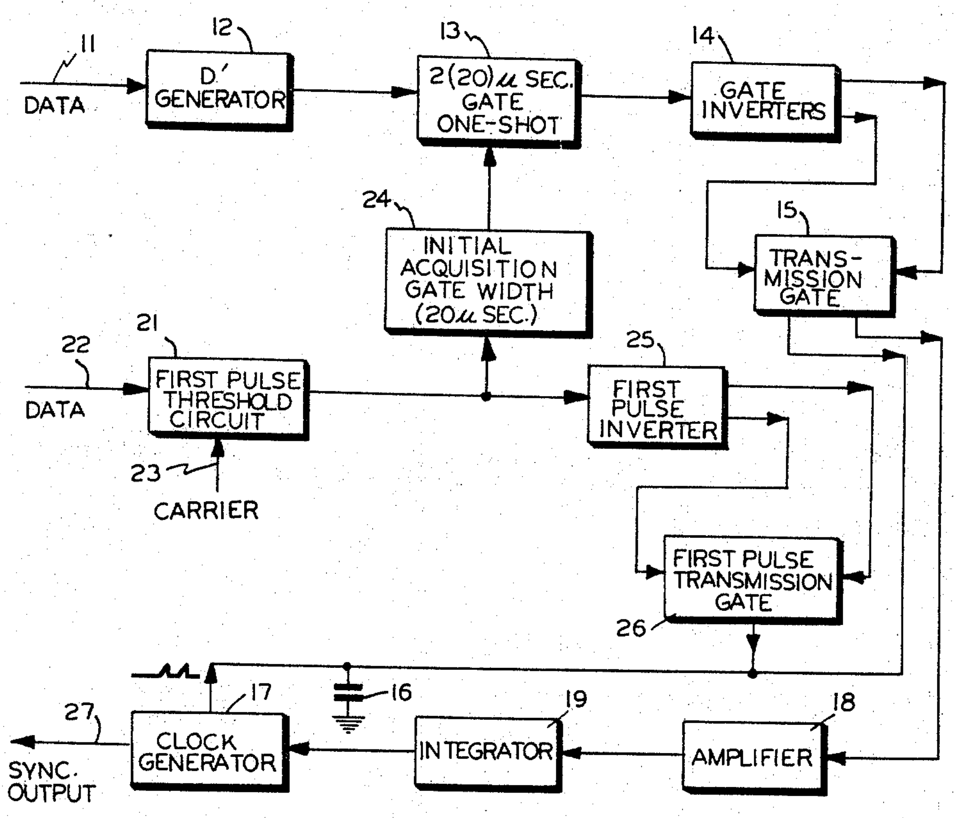

This invention relates generally to synchronizing systems and more particularly to systems which provide a locally generated clock pulse synchronized with received binary data which contains no specific synchronizing signals.

The use of high speed data processing equipment for all kinds of information and data has expanded to the point where communication between different remotely located portions of an integrated system becomes an essential requirement if the full capabilities of the data processing system are to be realized. In general the information rate of most data processors is higher than that of all but the most premium type of information channels. The interconnection of high speed data processing equipment by means of the relatively narrow band voice and teletype channels now in operation provides an opportunity for the utmost flexibility in interconnecting the equipment and provides for almost all applications an acceptable information rate in conjunction with suitable storage facilities for the data prior to and after transmission.

In order to conserve the information capacity of the channel where low capacity voice circuits are used for the transmission of the data, it is conventional practice to transmit the information as a binary pulse train without additional synchronization signals or precise control of the frequency of the pulse rate. Under these conditions it is necessary to derive the synchronization of the receiving equipment directly from the information content of the message by a determination of the binary transitions and generating a local clock signal which then fits the incoming data train.

The generation of a local clock signal would be a comparatively simple matter for ideal binary signals where the transitions between the two binary states occur at regularly predictable intervals although the actual pattern of such transitions will be determined by the actual information content of the message. Under the conditions that exist with most message channels, however, and particularly the narrow band channels with which the present invention is intended to be used, distortion, in the form of jitter is present in which the occurrence of a transition in the binary pulse train may vary as much as 40 percent or more either before or after the expected or normal transition time. With high percentage jitter distortion, the development of a clock signal which occurs in a position most likely to sample correctly the binary data train and obtain a correct output indicative of the actual state of the bit transmitted for that instant presents a problem of some difficulty. In particular it has been found necessary to provide a phase correction for the generator clock in order to follow the phase variations of the binary signal which variation may occur in a random fashion and thus not be related to the frequency of the binary data rate or require a change in the frequency of the clock generator.

Relatively precise frequency correspondence between the clock generator and the data rate must be maintained, however, and accordingly an average or frequency control for the clock generator must be provided to assure that over a long term message the clock is running at the data rate. Prior art arrangements for providing both phase and frequency control have been relatively complex or relied upon the use of tuned circuits which limited their operation to a particular data rate corresponding to the frequency of the tuned circuit.

The present invention avoids the disadvantages of the prior art and further provides improvements in performance which are achieved with a relatively simple and economical synchronizing system. The present invention includes a simple and reliable arrangement for producing a phase correction at each data transition which produces a resulting phase adjustment which is proportional to the phase error and is effective immediately to rephase the clock oscillator to provide the proportional correction effective for the next data bit interval. During normal operation the proportional correction applied for phase error is relatively small but in order to provide for rapid acquisition of synchronous operation for the clock generator a rapid acquisition mode is operated for a predetermined interval at the reception of each message. It has further been found that if the first data transition is employed to rephase the clock generator in exact synchronism therewith that the rapid synchronization of the clock to the incoming data will be enhanced since the rapid acquisition mode then operates from an initially phased clock which is correct with respect to the first received pulse. Although this first pulse may itself have jitter error, the probabilities of this error being greatly different from that expected for the subsequent transitions in the message is low and hence by providing a 100 percent phase correction to the first pulse the acquisition of the correct phase and frequency for the clock generator is accomplished in a minimum number of bit intervals during the acquisition message transmitted prior to each data transmission.

The principal object of the present invention is, accordingly, the provision of a reliable synchronizing system for binary data reception which is relatively simple and economical and yet capable of use under widely varying conditions with little or no maintenance required.

A feature of the invention is the provision of a timing wave form from which phase advancing or retarding corrections can be produced effective on the clock pulse output with such corrections being immediately applied and directly proportional to the phase error. A further feature is the provision of a relatively stable frequency source for the clock pulses which is capable of random phase corrections and is susceptible to rapid acquisition both of the phase and the frequency of the incoming data without sacrificing the advantages of the stability of the oscillator during normal operation of long term messages.

A further feature of the invention is the provision of improved circuits which are stable and reliable in long term operation and without the need for any critical adjustments.

Figure 3:
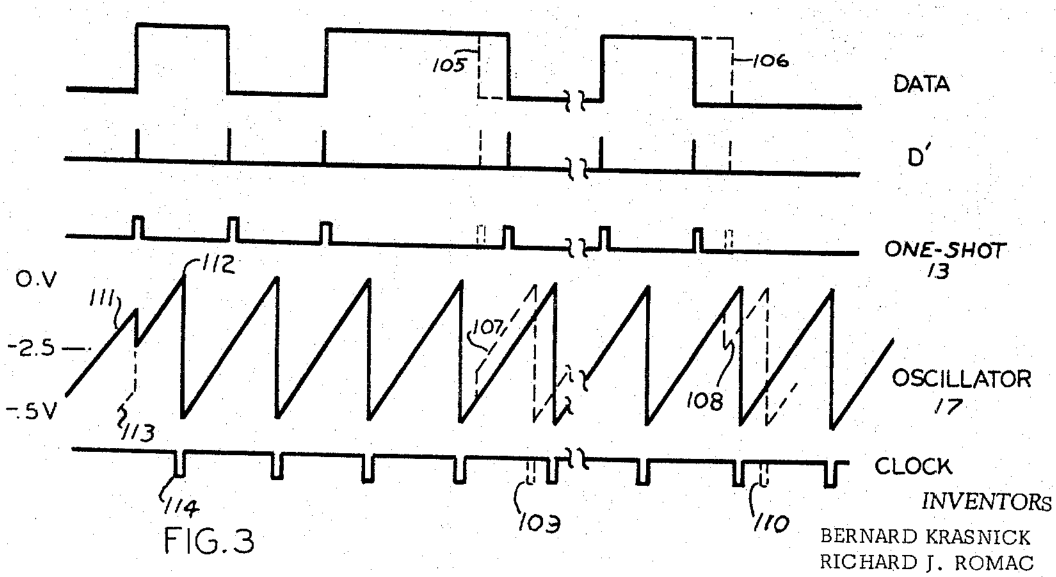
Figure 2A:
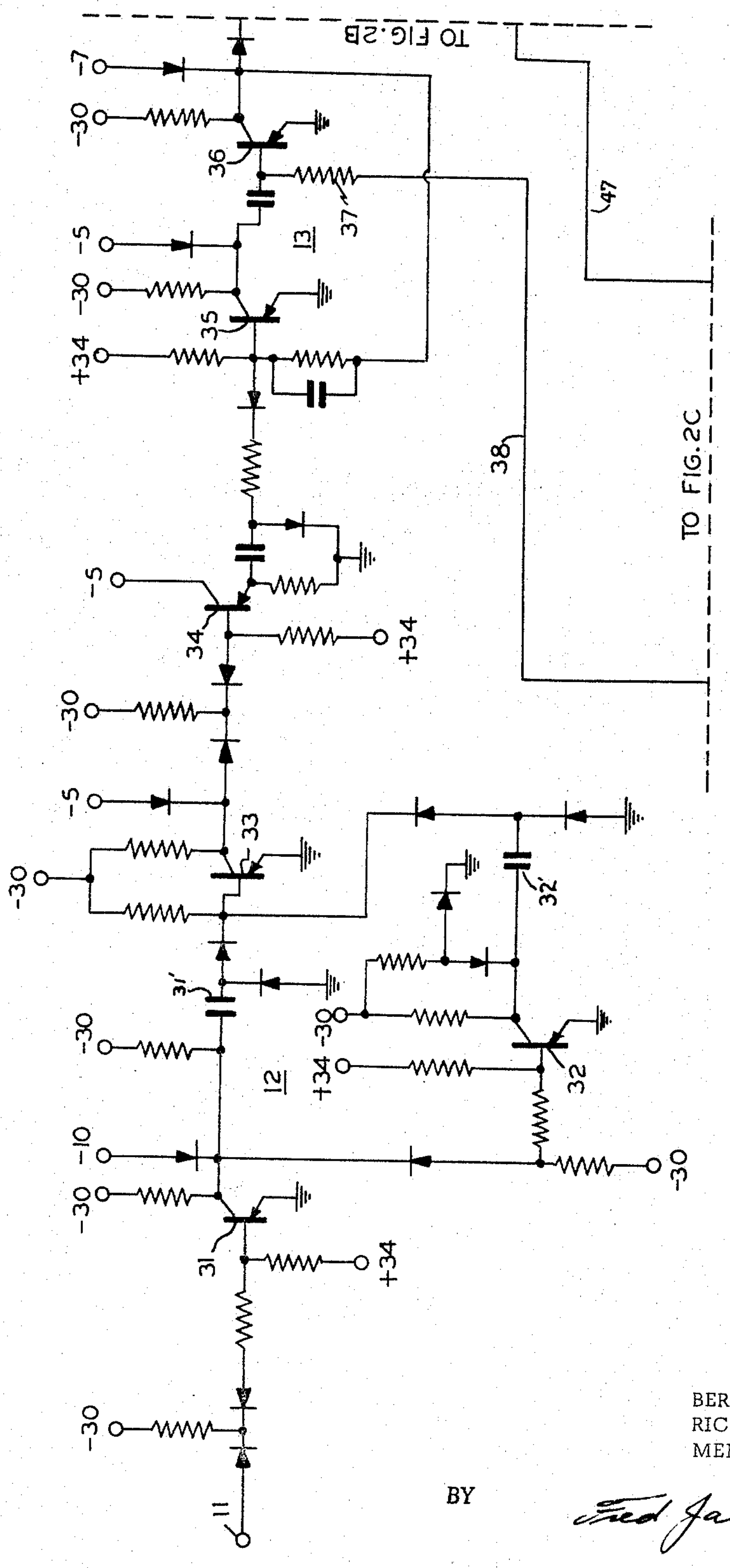
Figure 2B:
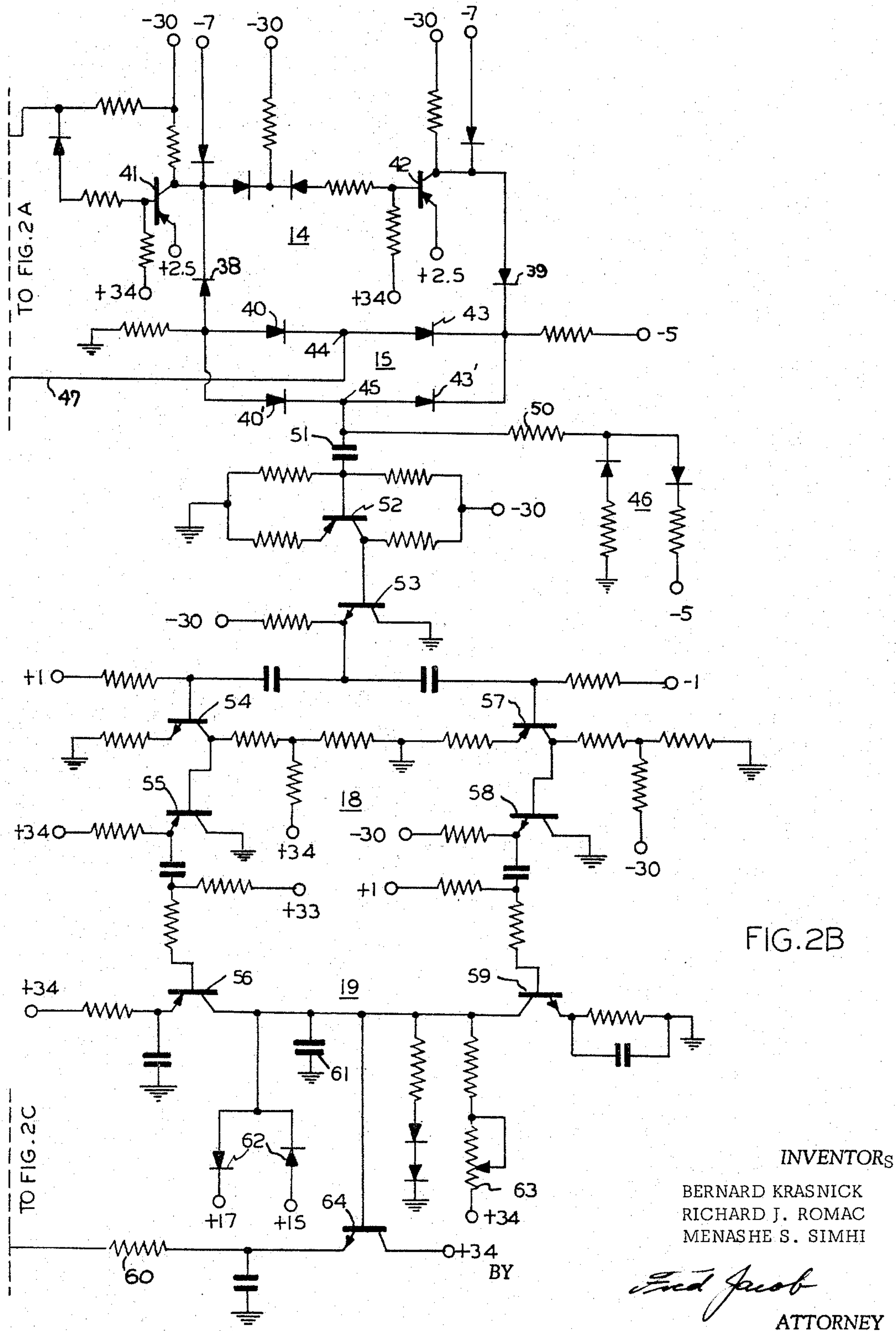
Figure 2C:
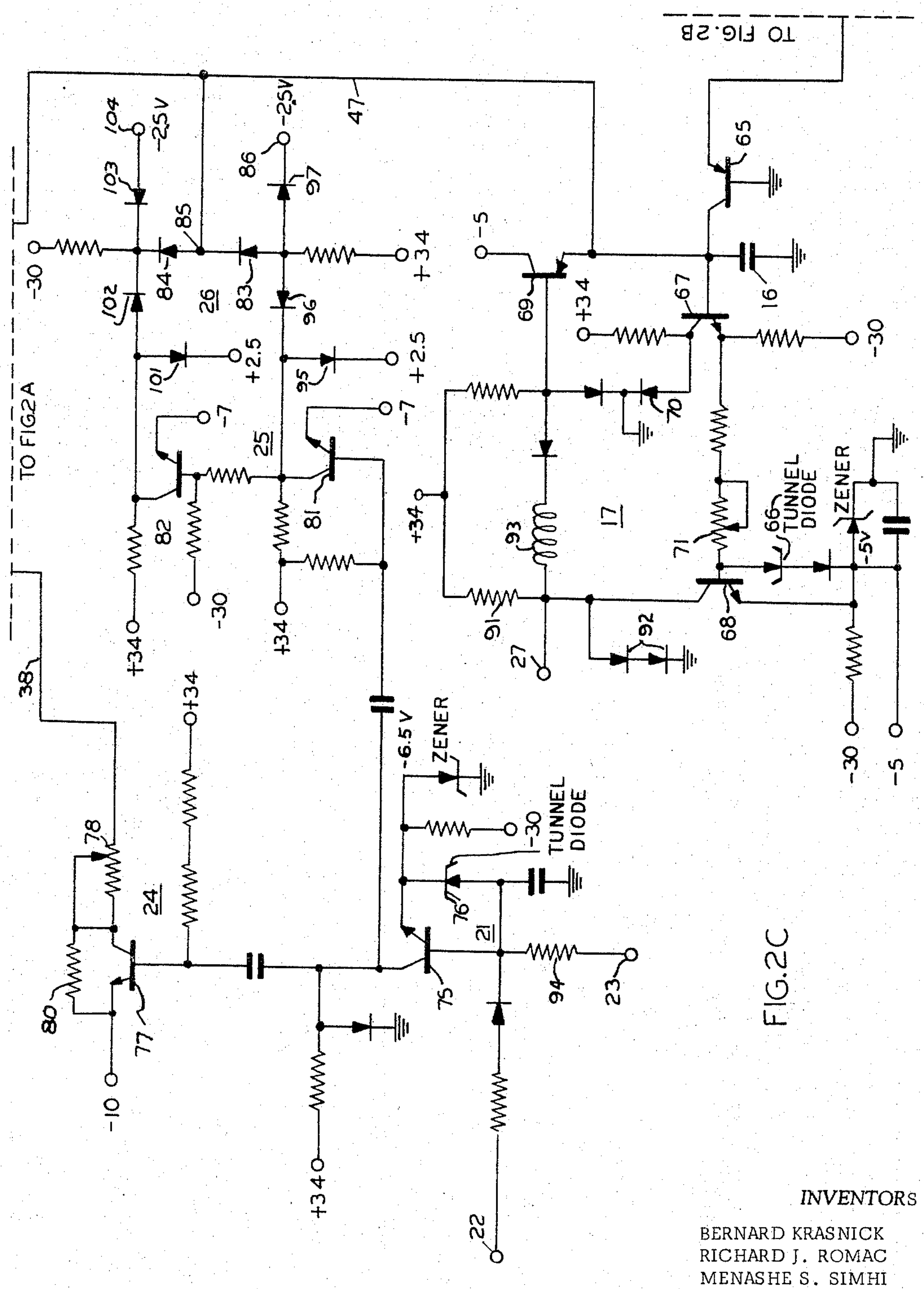

Other objects and features of the invention will be apparent from the following detailed description taken in conjunction with the accompanying drawings wherein:

FIG. 1 is a block diagram generally indicating the system in accordance with the invention;

FIGS. 2*a*, *b* and *c* taken together as indicated show a schematic wiring diagram of the present preferred embodiment of the invention; and FIG. 3 is a waveform diagram useful in explaining the operation of the invention.

Referring now to FIG. 1 the general arrangement of the invention provides a system which converts binary data at terminal 11 which is in the form of a rectangular wave having positive and negative portions separated by transitions therebetween into individual pulses occurring at the data transitions as generated by the D′ generator 12. Each data transition is represented by an output pulse from the generator 12 and each pulse from generator 12 triggers a one-shot 13 which normally generates a two microsecond pulse at its output which pulses after passing gate inverters 14 enable transmission gate 15. The transmission gate 15 is connected to a sawtooth discharging capacitor 16 of clock generator 17 and operates to rephase the sawtooth charging in capacitor 16 during each interval when transmission gate 15 is enabled if phase error is present. Any phase error signal that is present is also applied through amplifier 18 to an integrator 19 and the average of any error existing over the integration period of the integrator 19 is effective to change the frequency of the clock generator 17.

In order to provide rapid initial acquisition and first pulse 100 percent phase correction, a first pulse threshold circuit 21 is employed having as input at terminal 22 the binary data train and at input 23 a carrier frequency presence signal is applied to enable the threshold circuit to respond to the next impulse occurring at data terminal 22. Upon the occurrence of the first data pulse at terminal 22 after the carrier presence signal appears at terminal 23, the first pulse threshold circuit 21 triggers an initial acquisition gate circuit 24 which is effective to change the two microsecond pulse width of one-shot 13 to have twenty microsecond pulse width. This long pulse width is effective to apply any existing phase correction through gate inverters 14 and transmission gate 15 to the sawtooth capacitor 16 for the increased time duration of the pulse output of the one-shot 13 and, hence, provides for a greater correction during each transition of the acquisition mode.

The pulse output of the first pulse threshold circuit 21 is applied through pulse inverters 25 to a first pulse transmission gate 26 which operates to clamp the sawtooth capacitor 16 at the voltage corresponding to the midpoint of the sawtooth rise only for the first data transition. Thus the phase of the sawtooth wave generated by the clock generator 17 is correct relative to the phase of the first data pulse received.

The clock generator 17 generates a precise clock pulse output train at terminal 27 coincident with the rapidly falling portion of the sawtooth wave, and hence the clock pulse is ideally positioned in the middle of the binary bit intervals and can be used to sample the binary data train at the times when it is most probable that the state of the binary signal will correctly represent the information content of the message.

Referring now to FIGS. 2*a*, *b* and *c* assembled as indicated, binary input data on terminal 11 is inverted in transistor 31 and applied to transistors 32 and 33 with the output of transistor 32 being combined at the input of transistor 33 to produce individual timing pulses at each data transition. Transistor 32 is biased normally to cut-off and, hence, passes negative signals while positive signals are applied without inversion from the collector of transistor 31 to the base of transistor 33. Each path for the positive and negative transition signals to the base of transistor 33 includes differentiating capacitors 31′ and 32′ to produce accurate timing pulses. These accurate timing pulses pass through emitter follower transistor 34 and its associated circuit for further shaping and impedance change before being applied to trigger the gate one-shot 13 which consists of a pair of transistors 35 and 36 regeneratively connected. The pulse width of the one-shot 13 is determined by a time constant including the resistance path of resistor 37 which is connected by lead 38 to additional resistors which will be described in connection with the initial acquisition mode of operation.

The output of the one-shot 13 is a series of pulses of predetermined width depending upon the mode of operation (acquisition or synchronized) as hereinafter described. For the duration of the pulse outputs of the one-shot 13, gate inverter circuit 14 supplies opposed phase enabling pulses from transistors 41 and 42 to the transmission gate 15. The transmission gate 15 comprises four bridge connected diodes 40, 40′, 43 and 43′ which are normally non-conducting in the absence of the application of pulses from the gate inverters 14. The gate inverters 14 operate by having transistor 41 normally biased to cut-off and transistor 42 normally biased for conduction. For these conditions the collector of transistor 41 is at −7 volts and coupling diode 38 conducts thereby applying negative voltage to the anodes of the left-hand pair of diodes 40 and 40′ to make them non-conductive.

Conduction in transistor 42 applies approximately positive 2 volts to a coupling diode 39 which maintains the cathodes of bridge diodes 43 and 43′ positive thereby maintaining these diodes in the bridge 15 non-conducting. With all four diodes 40, 40′, 43 and 43′ non-conducting, junction points 44 and 45 are isolated from each other. Upon the application of a pulse from the one-shot 13 to the gate inverters 14, both transistors 41 and 42 change state and the coupling diodes 38 and 39 become open-circuited for the duration of the pulse of the one-shot. With the connection through the diodes 38 and 39 open-circuited, the bridge 15 operates by virtue of the negative 5 volt supply to ground connected thereacross to make all the four diodes 40, 40′, 43 and 43′ conductive. In this condition the bridge 15 acts to compare the potentials at junctions 44 and 45 to produce phase and frequency corrections which can be explained as follows.

With diodes 40 and 43 conducting during the pulse interval of one-shot 13, the junction 44 between diodes 40 and 43 is at −2.5 volts due to the voltage divider action from the negative 5 volt supply to ground. The junction 44 is connected by lead 47 to the charging capacitor 16 of the oscillator 17. The capacitor 16 will be charged or discharged depending upon whether the then existing voltage across the capacitor 16 is less than or greater than −2.5 volts. This action constitutes a direct phase correction for each data transition since it is effective to change the phase of the sawtooth wave by a small increment. The percent phase correction is determined by the source resistance of the junction 44 and the width of the pulse from one-shot 13. Hence the percent correction can be controlled by controlling the width of the pulse.

At the instant the diodes in the diode bridge 15 become conductive, the difference in potential across charging capacitor 16 and the voltage present at junction 45 between the diodes 40′ and 43′ appears as either a positive or a negative output voltage coupled through a coupling capacitor 51 to the base of a transistor 52. This signal has a magnitude equal to the difference between −2.5 volts applied to terminal 45 by a voltage divider network 46 and the instantaneous voltage on the capacitor 16 at the moment the diodes in the bridge 15 become conductive. This output coupled through capacitor 51 is developed across a relatively high resistance 50 employed to supply the junction 45 at −2.5 volts.

The transistor 52 is biased to apply bipolar signals to an emitter follower 53 corresponding to the difference in magnitude and sense of the signal appearing initially between the junctions 44 and 45. This bipolar signal is divided into a positive pulse path consisting of transistors 54, 55 and 56 and a complementary negative pulse path consisting of transistors 57, 58 and 59. The NPN transistor 54 is biased close to cut-off and amplifies only positive pulses and similarly PNP transistor 57 is biased close to cut-off and amplifies only negative pulses. The amplifiers 54, 55, 57 and 58 constitute amplifier 18 of FIG. 1 while the transistors 56 and 59 which couple respectively positive and negative pulses to a capacitor 61 constitute the main elements of the integrator 19 of FIG. 1. The charge on the capacitor 61 is determined by the integration of the positive and negative pulses applied thereto by the transistors 56 and 59, respectively, and the voltage swing across capacitor 61 is limited to approximately the two volt range determined by diode voltage clamps 62 to a +15 and +17 volt supply. A nominal voltage level for capacitor 61 is provided by a voltage divider which includes an adjustable resistor 63 which acts as a frequency control adjustment for the oscillator 17. The integration transistors 56 and 59 are complementary conductivity types and are biased to be normally conductive from the positive 30 volt supply to ground through both transistors. This conduction at a relatively high current makes the high impedance point of the collectors of both transistors 56 and 59 relatively immune to temperature variations and voltage variations, and hence the voltage at the collector circuit to which integration capacitor 61 is connected is determined solely by the input signal to the transistors 56 and 59 relative to the established no signal voltage level determined by the adjustment of resistor 63. This high impedance permits the voltage across the integration capacitor 61 to be an accurate representation of the summation of the positive and negative signals passed by the transistors 56 and 59, respectively.

The DC voltage of capacitor 61 is applied through an emitter follower transistor 64 and a large value constant current resistance 60 to establish the current value supplied through transistor 65 to discharge the sawtooth capacitor 16 at a rate determined by the voltage level on capacitor 61. Hence the relaxation oscillator period is controlled by the voltage on capacitor 61.

The oscillator 17 comprises the sawtooth capacitor 16, the constant current source through transistor 65 and a relaxation charging circuit through transistor 69 which is triggered by a tunnel diode 66 when the voltage thereacross applied through a transistor 67 reaches the switching threshold. When the tunnel diode 66 switches, a transistor 68 conducts generating a precise clock output pulse on terminal 27 and making transistor 69 conductive to recharge the sawtooth capacitor 16 to negative 5 volts for the start of the next discharging cycle. The connection from the emitter of transistor 67 to the base of transistor 68 includes an adjustable resistor 71 which determines the switching voltage point for tunnel diode 66 and, hence, provides a phase adjustment which also has some frequency adjusting effect.

The cycle of the oscillator 17 has the following sequence. As capacitor 16 charges from −5 volts toward zero, the transistor 67 acts as an emitter follower due to the presence of a conductive diode 70 to ground in the collector circuit offering a low collector impedance. Thus the current through the tunnel diode 66 increases as the voltage on capacitor 16 increases from −5 volts toward zero. At the switching point of the tunnel diode 66 the voltage across the tunnel diode increases to make the transistor 68 conductive. The rise in voltage across the tunnel diode 66 is referenced to a negative 5 volt level determined by a Zener diode supply. Prior to conduction in the transistor 68, the output terminal 27 is in the neighborhood of zero volts due to conduction from the positive 34 volts supplies through collector resistor 91 and conducting diodes 92. When the transistor 68 becomes conductive, the output terminal 27 goes to negative 5 volts as determined by the emitter circuit negative voltage supply for the transistor 68. This negative pulse has a two microsecond duration and is the outlook clock signal of the synchronizer.

The negative pulse signal on output terminal 27 is also applied through an inductor 93 to the base of transistor 69. The transistor 69 is thus made conductive to charge capacitor 16 to negative 5 volts from the collector supply of transistor 69. When the capacitor 16 charges to approach negative 5 volts, the current through tunnel diode 66 decreases until the transition point is reached where it switches to the low voltage state thereby cutting off transistor 68 and ending the two microsecond output clock pulse on terminal 27. The action of the inductor 93 in introducing a delay in the feedback loop assures that capacitor 16 will be fully charged to the negative 5 volt supply level.

The first pulse threshold circuit 21 includes a transistor 75 and a tunnel diode 76 connected to supply a single pulse to the initial acquisition gate width control circuit 24 and the first pulse inverters 25. The signal carrier input terminal 23 is a step function from −8 to +8 volts upon the detection of a carrier and the +8 volt level is sustained for the duration of the reception of the carrier signal. The data signal on terminal 22 varies from −8 to +8 volts for the transitions involved in the transmission of binary data. When +8 volts first appear on the carrier terminal 23, the tunnel diode 76 is conducting a small current due to the presence of a resistor 94 in series with the tunnel diode 76 and a negative 6.5 volt Zener supply. When the first data pulse arrives and terminal 22 rises to +8 volts, the increased current flow from the −6.5 volt Zener supply through the tunnel diode 76 to terminal 22 passes the switching threshold of tunnel diode 76 to put the tunnel diode in the high voltage region thereby establishing a bias from base to emitter of the transistor 75 which makes it saturate. This change of state applies a negative pulse from the collector of transistor 75 to the base of a transistor 77 and the base of a transistor 81. As data signals on terminal 22 vary from +8 to −8 volts, the change in current in tunnel diode 76 is not sufficient to switch it from the high voltage region and thus transistor 75 remains conductive after having produced one and only one output pulse. Upon the return to negative 8 volts of both terminals 22 and 23 signifying the end of the reception of the carrier as well as a negative 8 volt condition for the data signal, the decrease in current through tunnel diode 76 is sufficient to switch the tunnel diode to its low voltage state thereby resetting the circuit and providing the conditions which will produce a single pulse output from the transistor 75 upon the subsequent detection of carrier at terminal 23 and data transitions at terminal 22.

The gate width control circuit 24 includes transistor 77 which is normally saturated during the synchronized mode and which is cut off by the first pulse signal from transistor 75. The transistor 77 in cut-off establishes the acquisition mode by introducing a resistor 80 in series with an adjustable resistor 78 which is connected to lead 38 in the gate width determining time constant circuit of one-shot 13. Thus the width of the output of one-shot 13 can be selected by the adjustable resistor 78 and when transistor 77 is cut off the additional resistance of resistor 80 changes the normal two microsecond gate width synchronized mode of one-shot 13 to be twenty microseconds for the acquisition mode, as a specific example, this provides approximately a 20 percent phase correction instead of the normal 2 percent correction.

The first pulse threshold circuit 21 also applies the output of transistor 75 to the first pulse inverter 25 which comprises transistors 81 and 82. The transistors 81 and 82 are connected to control the gating diodes 83 and 84 of first pulse transmission circuit 26. Diodes 83 and 84 are connected at a junction 85 to which is connected lead 47 which also is connected to the sawtooth capacitor 16. The transistor 81 is normally saturated when no negative pulse is received at its base and transistor 82 is normally cut off. For these conditions the negative 7 volt emitter supply of transistor 81 is effective to cut off a diode 95 and to make a diode 96 conductive thereby applying the negative 7 volt level to the anode of diode 83 making it nonconductive. A diode 97 to the negative 2.5 volt supply at terminal 86 is also cut off. The cut-off condition of the transistor 82 makes the collector approximately +2 volts due to conduction in diodes 101 and 102 thereby making the base of diode 84 positive 2 volts and maintaining it non-conductive. Diode 103 to negative 2.5 volt supply terminal 104 is also cut off.

Upon the application of a negative pulse to the base of transistor 81 from the first pulse threshold transistor 75, the transistor 81 is cut off and the transistor 82 becomes conductive. This reverses the conductive state of the diodes previously described making diode 95 conductive, diode 96 cut-off and diode 97 conductive. Similarly, diode 101 is cut off, diode 102 is cut off and diode 103 becomes conductive. With the diodes 102 and 96 cut off and the diodes 97 and 103 conductive, the junction 85 between the diodes 84 and 83 has available two oppositely poled unilaterally conductive paths to −2.5 volt supply at the respective terminals 86 and 104. Thus no matter what the potential at junction 85 may be due to the instantaneous potential across charging capacitor 16, it is possible for conduction to occur either in diode 83 or diode 84 to charge the capacitor 16 to the negative 2.5 volt level from either terminal 86 or terminal 104. Thus a 100 percent phase correction can be made for any range of the charging cycle of the capacitor 16 from −5 volts to zero. If the capacitor 16 is between −5 volts and −2.5 volts, the diode 83 will conduct charging the capacitor 16 to −2.5 volts. If the capacitor 16 is between −2.5 volts and zero, diode 84 will be conductive charging the capacitor 16 to −2.5 volts. This operation takes place only during the interval of the negative pulse from the threshold transistor 75 which is of relatively short duration and does not recur for any other condition of operation except the negative pulse produced by the first data pulse received in each transmission. Thus the sawtooth capacitor 16 is rephased to the mid-point of the sawtooth rise upon the occurrence of the first pulse in each received transmission.

While the operation of the circuit will be clear from the foregoing description, the general function of the synchronizing system may be understood by reference to FIG. 3. The incoming data signal is represented by the top waveform marked DATA in FIG. 3. and consists of a square wave of random pattern representing the reception of a succession of zeros and ones in a binary message. Each transition from negative to positive and from positive to negative of the data signal is converted into a trigger pulse in the form of the wave indicated as D′ in FIG. 3. The D′ trigger is used to generate square pulses of predetermined width from the one-shot 13 as indicated. These pulses as applied to the gate inverters 14 are negative as previously described. The width of these pulses is two microseconds during the synchronized mode of operation after the synchronizer has acquired the frequency and phase of the incoming data by an initial operation during the acquisition mode at the beginning of each message during which the width of the one-shot pulse is twenty microseconds. For this purpose it is customary to precede each message by a short transmission of any non-information bearing bit sequence of ZEROS and ONES to permit synchronization of the receiving equipment.

As previously described, the DATA waveform is subject to jitter in which transitions may occur before a normal transition time as indicated at 105 or later than a normal transition time as indicated at 106 in FIG. 3. These transitions produce normal D′ triggers and one-shot outputs with the result that the sawtooth wave of the oscillator 17 has its phase advanced as indicated at 107 or its phase retarded as indicated at 108. The actual corrections indicated at 107 and 108 are shown in exaggerated magnitude as the normal 2 percent change which occurs during each period of the sawtooth during the synchronized mode will be cumulative from cycle to cycle until phase agreement with the received incoming data is achieved. The rephased sawtooth rephases the output of the clock as indicated at 109 and 110. In each instance the subsequent pulses would be positioned relative to the rephased pulses 109 or 110 and the cumulative effect of rephasing the sequence of such pulses by the 2 percent correction provided by the designed parameters of the circuit provides minimum phase error. This same action occurs during the acquisition mode when the correction is 20 percent except that the number of such rephasing corrections that are ordinarily required is greatly reduced due to the large increment of correction for any existing error that occurs when the correction applied for each sawtooth cycle is 20 percent of the error.

The first pulse acquisition action is indicated at the beginning of the OSCILLATOR and CLOCK waves of FIG. 3. Upon the occurrence of a first data transition the D′ and one-shot pulses produce a rephasing of the oscillator wave to the −2.5 volt level. Thus if the sawtooth wave is advanced in phase as indicated at 111 relative to the first transition, the voltage level of the sawtooth will be reduced to −2.5 volts and a full half cycle rise of the sawtooth will occur to the point 112 where the first clock pulse 114 will be generated one half a sawtooth cycle after the first transition. Similarly, if the sawtooth wave is retarded relative to the first transition as indicated at 113, the sawtooth voltage will be increased to the negative 2.5 volt level thereby providing one half a sawtooth period to reach the point 112 and the generation of first clock pulse 114 one half a sawtooth period after the first data transition.

Various modifications of the invention herein disclosed will be apparent to those skilled in the art and various alternate details of the disclosed embodiment may be made without departing from the scope of the invention defined in the appended claims.

What is claimed is:

1. A pulse communication synchronizer for a binary data train of pulses having detectable transitions between binary states comprising an oscillator for generating a timing waveform, means responsive to said transitions and said waveform to obtain an analogue quantity representative of the phase error therebetween for altering the individual periods of said waveform in magnitude and sense to position a reference point within said periods closer to said transitions, means for integrating said analogue quantity to obtain a second quantity representing the average difference between the time of said transitions and said reference point to control the frequency of said oscillator and reduce said average difference to a minimum, and means for deriving an output wave synchronized with said timing waveform.

2. A pulse communication synchronizer for a binary data train of pulses having detectable transitions between binary states comprising an oscillator for generating a sawtooth wave, means responsive to said transitions and said wave to obtain an analogue quantity representative of the phase error therebetween for displacing a reference point of said wave toward said transitions, means for integrating said analogue quantity representative of the magnitude and sense of the time difference between said reference point and said transitions, means responsive to the integrated value of said quantity for controlling the frequency of said oscillator, and means for deriving an output wave synchronized with the period of said oscillator.

3. Apparatus according to claim 2 and including means responsive to the initial reception of said binary data train for relatively increasing the magnitude of the displacement of said reference point toward said transitions during an initial interval at the beginning of each received message.

4. Apparatus according to claim 2 and including means responsive only to the reception of an initial pulse of said binary data train for displacing said reference point in said wave to coincide with the transition corresponding to said initial pulse.

5 Apparatus according to claim 3 and including means responsive only to the reception of an initial pulse of said binary data train for displacing said reference point in said wave to coincide with the transition corresponding to said initial pulse.

6. A pulse communication synchronizer for binary signals comprising means for detecting binary transitions of said signals, an oscillator for generating a sawtooth wave, a voltage comparator responsive to detected transitions of said signals for comparing the voltage level of said wave during said transitions with a predetermined voltage level, means responsive to the magnitude and sense of the difference in said levels for displacing said wave in a direction to reduce said difference, means responsive to the time average of said difference for controlling the frequency of said oscillator to the frequency of the data rate of said binary signals, and means for deriving an output wave synchronized with said sawtooth wave.

7. A pulse communication synchronizer for binary signals comprising means for detecting binary transitions of said signals, an oscillator for generating a sawtooth wave, a voltage comparator responsive to detected transitions of said signals for comparing the voltage level of said wave during said transitions with a predetermined voltage level, a phase correction circuit responsive to each of said transitions for applying to said oscillator for a predetermined time interval a phase correction proportional to the magnitude and sense of the voltage difference between said levels, means for integrating a plurality of signal quantities proportional to the product of said voltage difference and said time interval to obtain an average phase error signal, means for applying said average phase error signal to control the frequency of said oscillator to reduce said average phase error, and means for deriving an output wave synchronized with said sawtooth wave.

8. Apparatus according to claim 7 and including means responsive to the initial reception of said binary signals for altering said predetermined time interval to a substantially longer time interval during a predetermined period after said initial reception.

9. Apparatus according to claim 7 and including means responsive only to the reception of an initial pulse of said binary signals for changing the phase of said sawtooth wave to correspond to said difference in said voltage levels being zero.

10. Apparatus according to claim 8 and including means responsive only to the reception of an initial pulse of said binary signals for changing the phase of said sawtooth wave to correspond to said difference in said voltage levels being zero.

11. A pulse communication synchronizer for binary signals comprising means for detecting binary transitions of said signals, means responsive to detected transitions for producing a gating pulse of predetermined duration, an oscillator for generating a sawtooth wave, a voltage comparator enabled during said gating pulse for comparing the instantaneous voltage level of said sawtooth wave with a predetermined voltage level corresponding to the mid-point of said sawtooth and producing an output signal representative of the magnitude and sense of the difference between said levels, means for applying said output signal to change the phase of said sawtooth wave by an increment determined by the duration of said gating pulse and the magnitude and sense of said difference, separate complementary transistor amplifier channels for amplifying respective positive and negative portions of said output signal, means for integrating the outputs of said channels to produce a control voltage which has a nominal value and varies in accordance with the difference in frequency of said oscillator and said binary signals, means for applying said control voltage to control the frequency of said oscillator, and means for deriving an output wave synchronized with said sawtooth wave.

12. Apparatus according to claim 11 in which said oscillator is a relaxation oscillator having a charging and discharging capacitor for generating said sawtooth wave and said output signal is applied as an increment of charge to said capacitor to change the charge thereon.

13. Apparatus according to claim 12 and including means responsive to the reception of initial binary signals for temporarily increasing the width of said gating pulse to increase the increments of charge applied to said capacitor.

14. Apparatus according to claim 12 and including means responsive to the detection of an initial transition for charging said capacitor to a voltage corresponding to the mid-point of said sawtooth during said gating pulse that corresponds to said initial transition.

15. Apparatus according to claim 13 and including means responsive to the detection of an initial transition for charging said capacitor to a voltage corresponding to the mid-point of said sawtooth during said gating pulse that corresponds to said initial transition.

16. A pulse communication synchronizer for binary signals comprising means for detecting binary transitions of said signals, means responsive to detected transitions for producing a gating pulse of predetermined duration, a relaxation oscillator for generating a sawtooth wave by charging and discharging a first capacitor, a voltage comparator enabled during said gating pulse for comparing the instantaneous voltage level of said sawtooth wave with a predetermined voltage level corresponding to the mid-point of said sawtooth and producing an output signal representative of the magnitude and sense of the difference between said levels, means for applying said output signal to change the charge on said first capacitor thereby to change the phase of said sawtooth wave by an increment determined by the duration of said gating pulse and the magnitude and sense of said difference, separate complementary transistor amplifier channels for amplifying respective positive and negative portions of said output signal, a pair of complementary transistors having collectors joined and emitter-collector paths serially connected for conducting a relatively high direct current, means coupling the outputs of said channels to the respective bases of said pair of complementary transistors, a second capacitor charged to the potential of said collectors for integrating the outputs of said channels, means for applying the voltage across said second capacitor through a constant current source to said first capacitor to control the frequency of said sawtooth wave, and means for deriving an output wave synchronized with said sawtooth wave.

References Cited

UNITED STATES PATENTS

| | | | |
|---|---|---|---|
| 2,789,224 | 4/1957 | Leonard. | |
| 3,156,874 | 11/1964 | Verdibello. | |
| 3,197,739 | 7/1965 | Newman | 340—174.1 X |
| 3,204,195 | 8/1965 | Maestre. | |

OTHER REFERENCES

Featherstone: "Timing Signal Generator" in IBM Technical Disclosure Bulletin, vol. 5, No. 10, dated March 1963, pp. 103–104.

ARTHUR GAUSS, *Primary Examiner.*

S. D. MILLER, *Assistant Examiner.*